US 7,404,631 B2

(12) United States Patent
Nakajima

(10) Patent No.: US 7,404,631 B2
(45) Date of Patent: Jul. 29, 2008

(54) INK JET INK AND RECORDING METHOD

(75) Inventor: Atsushi Nakajima, Hachioji (JP)

(73) Assignee: Konica Minolta Holdings, Inc., Tokyo (JP)

( * ) Notice: Subject to any disclaimer, the term of this patent is extended or adjusted under 35 U.S.C. 154(b) by 0 days.

(21) Appl. No.: 10/538,437

(22) PCT Filed: Dec. 17, 2003

(86) PCT No.: PCT/JP03/16151

§ 371 (c)(1),
(2), (4) Date: Jun. 10, 2005

(87) PCT Pub. No.: WO2004/055122

PCT Pub. Date: Jul. 1, 2004

(65) Prior Publication Data

US 2006/0050116 A1    Mar. 9, 2006

(30) Foreign Application Priority Data

Dec. 18, 2002    (JP) ............................. 2002-366441

(51) Int. Cl.
*G01D 11/00* (2006.01)
(52) U.S. Cl. ..................... 347/100; 347/102; 347/95
(58) Field of Classification Search ................ 347/100, 347/101, 95, 96, 86, 85, 84, 102; 106/31.6, 106/31.27, 31.13; 523/160
See application file for complete search history.

(56) References Cited

U.S. PATENT DOCUMENTS 4,279,653 A * 7/1981 Makishima et al. ......... 347/100

| 4,489,334 A * | 12/1984 | Owatari ........................ 347/86 |
| 4,840,882 A | 6/1989 | Iwagaki et al. |
| 5,854,300 A | 12/1998 | Gould et al. |
| 6,540,346 B1 * | 4/2003 | Akahira et al. ............... 347/107 |
| 2001/0047044 A1 * | 11/2001 | Tanabe et al. .................. 522/75 |
| 2002/0065335 A1 | 5/2002 | Noguchi et al. |
| 2004/0119797 A1 * | 6/2004 | Yoshizawa et al. ............ 347/85 |

FOREIGN PATENT DOCUMENTS

| EP | 0 799 871 A | 10/1997 |
| EP | 1 188 806 A | 3/2002 |
| GB | 2303376 A | 2/1997 |
| JP | 5-17712 A | 1/1993 |
| JP | 5-54667 B2 | 8/1993 |
| JP | 6-200204 A | 7/1994 |
| JP | 9-165541 A | 6/1997 |
| JP | 2000-504778 A | 4/2000 |

OTHER PUBLICATIONS

Shikizai Kyokaishi, Journal of the Japan Society of Colour Material, vol. 75, No. 8, pp. 394-400 (Aug. 2002).
Hiromichi Noguchi, "UV Inkjet Gijutsu no Tenbo", Shikizai Kyokaishi, Aug. 20, 2002, vol. 75, No. 8, pp. 394-400.
Derwent Publications LTD., Section Ch, Week 200123, Class A82, AN 2001-220464, XP 002379124 of JP 2000 318296 A (Osaka Insatsu Ink Seizo KK) Nov. 21, 2000.

* cited by examiner

*Primary Examiner*—Manish S Shah
(74) *Attorney, Agent, or Firm*—Frishauf, Holtz, Goodman & Chick, P.C.

(57) ABSTRACT

A UV-setting ink-jet ink containing at least color materials, UV-polymeric compound, and photo-induced polymerization initiator in a water-based medium, wherein the concentration of oxygen dissolved in the ink is 0.1 to 2 ppm at 25° C. This structure of this invention can provide UV-setting ink-jet inks which can always be ejected normally regardless of long continuous uses and an ink-jet recording method using said inks.

5 Claims, No Drawings

INK JET INK AND RECORDING METHOD

This application is the United States national phase application of International Application PCT/JP2003/016151 filed Dec. 17, 2003.

TECHNICAL FIELD

This invention relates to UV-setting ink-jet ink which can react and harden when exposed to ultraviolet rays and an ink jet recording method which forms and fixes images by an ink jet recording system. Particularly, this invention relates to ink-jet ink which can keep high ejection stability regardless of time lapse and an ink jet recording method.

BACKGROUND

In recent years, the ink jet recording method has been used for various print-related fields such as photo printing, various printings, and particular printings of markings and filters as this method can form images easily and cheaply. This method can form photo-like images (equivalent to silver-salt photo images in quality) by using a recording device which ejects and controls fine ink dots, ink-jet ink which has improved its color reproduction range, durability, and ejection aptitude, and dedicated paper which has strikingly improved the ink absorptivity, the coloring ability of color materials, and surface glossiness. As just described, the improvement of the image quality of the ink jet recording method can be accomplished only when the recording device, the ink-jet ink (or simply abbreviated as ink), and the dedicated paper are all optimum.

However, the paper dedicated for the ink jet system is rather expensive and this increases the printing cost. To save the recording cost, a lot of attempts have been made to record images on non-dedicated recording media by the ink jet recording method. Specifically, these attempts use a phase-change ink jet recording method using wax ink which is solid at room temperature, a solvent-based ink jet recording method using ink which mainly contains a quick-drying organic solvent, or a UV ink jet recording method using UV-setting ink which is cross-linked by ultraviolet ray (UV) light after it is recorded.

Among the above methods, the UV ink jet recording method has come to the fore as it can record on recording media which are resin-made, comparatively odorless, quick-drying, and non-ink-absorbing in comparison with the solvent-based ink jet recording method.

However, as described in Non-Patent Document 1, the UV ink jet recording method has various problems to be solved. Although Patent Documents 1 to 3 disclose UV-setting inks, under the circumstances, the inks are hardly adequate in terms of adhesiveness to various support members, sensitivity levels, stability of ink preservation, and stability of ink ejection, etc.

The UV-setting inks are loosely divided into two solventless UV ink which hardly contains non-hardening solvent and water-based UV ink in which a photo-induced polymeric compound is dissolved or dispersed in a water-based medium.

The solventless UV ink has merits of fast recording and already been in practical use since the ink can be hardened and dried simply by exposure to UV light and that the ink produces no harmful substance such as VOC. However, the solventless UV ink does not shrink during hardening and leaves mounds of ink fixed on the recording paper. This unlevelling can be smoothed to some extent by optimization of UV exposure timing and improvement of ink properties, but dot blurring and excessive glossiness will make the printout different from what is obtained by regular printing.

Meanwhile, the water-based UV ink has features that the water-based UV ink can use polymeric compound of higher viscosity than the solventless UV ink since the water-based UV ink using a water-based medium is diluted by a water-based solvent, that the water-based UV ink can reduce the ink volume and improve the image quality on the base material by evaporating the water medium from the UV-set ink, and that the water-based UV ink is available to the thermal type ink jet recording method. Generally, radical polymeric compounds can be widely used for the water-based UV ink. It is well known that active species (or radicals) in a radical reaction are quenched by oxygen.

As the solventless UV ink is less viscous than general UV-setting paint and the like, the ink has high dispersibility of oxygen into the ink. Therefore, attempts have been made to produce active species faster than oxygen disperses by intensifying the UV illumination and increasing the concentration of the photo initiator.

The water-based UV ink has an advantage in terms of sensitivity over the solventless UV ink since the water-based UV ink mainly uses water as the medium, has less dissolved oxygen than a hydrophobic organic solvent, and is hard to be inhibited.

Dissolved air and bubble cores (if any) in the normal water-based ink-jet ink will cause cavitations or the like when the ink is compressed and depressed repeatedly in the ink jet nozzle. To prevent this, attempts are made to remove the dissolved air from the ink as much as possible.

However, after careful studies and experiments, it is found that the water-based UV ink containing almost no dissolved air would not be ejected successfully after a long recording and exposure to UV light.

[Non-Patent Document 1]
Color materials, 2002, Vol. 75, No. 8, p.394-p.400

[Patent Document 1]
Tokukou H05-54667

[Patent Document 2]
Japanese Non-Examined Patent Publication H06-200204

[Patent Document 3]
Tokuhyou 2000-504778

SUMMARY

An object of this invention is to provide UV-setting ink-jet inks which has a stable ejection performance even after their long-term use for recording and an ink jet recording method using thereof.

(1) To attain the above object, one embodiment of this invention is a UV-setting ink-jet ink containing at least color materials, UV-polymeric compound, and photo-induced polymerization initiator in a water-based medium, wherein the concentration of oxygen dissolved in the ink is 0.1 to 2 ppm at 25° C.

(2) Another embodiment of this invention is an ink-jet recording method for forming images by ejecting UV-setting ink-jet ink which dissolves oxygen of 0.1 to 2 ppm in the ink at 2.25° C. onto a base material and applying ultraviolet lights to the ink on the base material.

DESCRIPTION OF THE PREFERRED EMBODIMENT

The ink-jet ink and the ink jet recording method which are preferred embodiments of this invention are characterized in that the concentration of oxygen dissolved in the UV-setting ink-jet ink is in a specific range. Generally, UV-setting inks use radical polymeric compounds. The radicals which are active species are quenched by oxygen of a specific concentration range in the ink. It is assumed that this quenching by oxygen prevents the ink from causing unwanted polymerization before being exposed to UV lights and gives stable ejection performance to the ink even after a long-term use of the ink for recording.

If the concentration of the dissolved oxygen is less than 0.1 ppm, the inhibition of polymerization by the dissolved oxygen will hardly occur. Further, at this concentration, UV light leaking from the UV light source near each ink jet nozzle will gradually harden the ink left on the nozzle surface. After a long-term recording and exposure to the UV light, the ink ejection from the nozzle may be unstable. If the concentration of the dissolved oxygen is greater than 2 ppm, bubble cores left in the ink channel and in the surface of a pigment which is used as a color material will cause a cavitation and the dissolved oxygen will reduce the hardening sensitivity. Therefore, the concentration of dissolved oxygen is preferably 0.5 to 2 ppm.

Another characteristic of this invention is to form images by ejecting UV-setting ink-jet ink which contains oxygen of a specific concentration range in the ink onto a base material and applying ultraviolet lights to the ink on the base material. To prevent the ink from absorbing oxygen from the outside air and to keep the concentration of dissolved oxygen in a specific range (0.1 to 2 ppm) in the ink, the ink supply system should preferably be made of a material that shuts off the air.

The concentration of dissolved oxygen can be controlled. It can be reduced by keeping the prepared ink in a vacuumed chamber and increased by keeping the prepared ink in the air.

The concentration of dissolved oxygen can be measured by a polarographic or galvanic instrument. The polarographic instrument is more preferable. The representative one of such polarographic instruments is Dissolved Oxygen Tester DO-32A (by DKK-TOA Corp.).

The color materials, ultraviolet ray polymeric compounds (UV polymeric materials), photo-induced polymerization initiator, and water-based media disclosed in Japanese Non-Examined Patent Publication 2000-117960 are available to the inks of this invention.

A typical example of ink composition is an aqueous solution of pigments (Pigment Yellow 74, Pigment Red 122, Pigment Blue 15:3, and Pigment Black 7) as color materials, high-viscosity and high-reactivity water-soluble UV polymeric compounds (Compound 1 and Compound 2), and water-soluble photo-induced polymerization initiator (Compound 3).

Compound 1

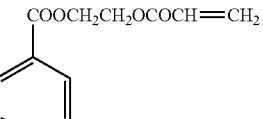

Compound 2

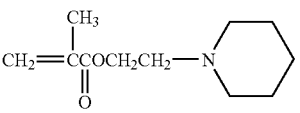

Compound 3

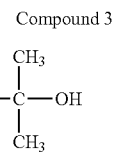

The effect of this invention can be increased by the use of radical polymeric compounds as the UV polymeric compound.

This is because the adequate control of the concentration of oxygen in the water-soluble medium can suppress polymerization of the ink near the ink-jet nozzle by leakage ultraviolet rays.

Available radical polymeric compounds are, for example, the compounds which are described in Japanese Non-Examined Patent Publications H07-159983, H08-224982, and H10-863, and Tokukou H07-31399.

The radical polymeric compounds can be any as long as the compounds contain at least one ethylenic unsaturated bond which can be radically polymerized in the molecule. They can contain any chemical structures such as monomers, oligomers, and polymers. The radical polymeric compounds can use one kind of such compounds or a mixture of two or more kinds at any ratio to improve the characteristics of the ink.

The compounds containing ethylenic unsaturated bonds which can be radically polymerized can be selected from a set of unsaturated carboxylic acids such as acrylic acid, methacrylic acid, itaconic acid, crotonic acid, isocrotonic acid, and maleic acid, their salts, ester, urethane, amides and anhydrates, acrylonitrile, styrene, and other unsaturated radical polymeric compounds such as unsaturated polyester, unsaturated polyether, unsaturated polyamide, unsaturated urethane, etc. Specifically, they can be selected from a set of acrylic derivatives (such as 2-ethyl-hexyl-acrylate, 2-hydroxy-ethyl-acrylate, butoxy-ethyl-acrylate, carbitol-acrylate, cyclo-hexyl-acrylate, tetra-hydro-furfuryl-acrylate, benzyl-acrylate, bis-(4-acryloxy-poly-ethoxy-phenyl) propane, neopentyl-glycol-di-acrylate, 1,6-hexane-diol-di-acrylate, ethylene-glycol-di-acrylate, di-ethylene-glycol-di-acrylate, tri-ethylene-glycol-di-acrylate, tetra-ethylene-glycol-di-acrylate, poly-ethylene-glycol-di-acrylate, poly-propylene-glycol-di-acrylate, penta-erythritol-tri-acrylate, penta-erythritol-tetra-acrylate, di-penta-erythritol-tetra-acrylate, tri-methylol-propane-tri-acrylate, tetra-methylol-methane-tetra-acrylate, olygo-ester-acrylate, N-methylol-acryl-amide, di-acetone-acryl-amide, and epoxy-acrylate), methacrylic derivatives (such as methyl-methacrylate, n-butyl-methacrylate, 2-ethyl-hexyl-methacrylate, lauryl-methacrylate, allyl-methacrylate, glycidyl-methacrylate, benzyl-methacrylate, di-methyl-amino-methyl-methacrylate, 1,6-hexane diol-di-methacrylate, ethylene-glycol-di-methacrylate, tri-ethylene-glycol-di-methacrylate, poly-ethylene-glycol-di-methacrylate, poly-propylene-glycol-di-methacrylate, tri-methylol-ethane-tri-methacrylate, tri-methylol-propane-tri-methacrylate, and 2,2-bis-(4-methacryl-oxy-poly-ethoxy-phenyl)-propane), and allyl derivatives (such as allyl-glycidyl-ether, di-allyl-phthalate, and tri-allyl-tri-mellitate).

More specifically, they can be commercial or industrially-known radical polymeric or crosslinking monomer, oligomer and polymer compounds which are described in "Handbook of crosslinking agents" edited by Sinzou Yamashita (published by Taiseisya Co., Ltd., 1981), "UV/EB Hardening Handbook (Raw Materials)" edited by Kiyomi Kato (published by Kobunshi Kanko Kai, 1985), "UV/EB Hardening Technology—Applications and Markets" edited by RadTech Japan (p-79, published by CMC, 1989), "Handbook of Polyester Resins" written by Eiichiro Takiyama (published by The Nikkankogyo Symbun Ltd., 1988), etc.

The content of the radical polymeric compound in the ink composition should be 1 to 97% by mass and preferably 30 to 95% by mass.

(Base Material)

Base materials available to this invention are regular uncoated paper, coated paper, non-absorptive support member, and so on. Among these base materials, the non-absorptive support members are preferable.

Non-absorptive support members available to this invention are non-absorptive plastic members and their films. Representative plastic films are, for example, PET, OPS, OPP, ONy, PVC, PE, and TAC films. Other available plastic materials are polycarbonate, acrylic resin, ABS, poly-acetal, PVA, and rubbers. Naturally, the support members can be metals and glasses. Among these recording materials, the effect of this invention is remarkable when images are formed on thermo-shrinkable PET, OPS, OPP, ONy, and PVC films. Usually, these materials curl and deform when inks on them harden and shrink and by heat due to the hardening reaction. Further, ink films on these materials are hard to follow their shrinkage.

The surface energies of these plastic films differ too much and sizes of ejected dots are greatly dependent upon the types of recording materials. This has been a great problem. The structures of this invention contain plastic films of low surface energies (OPP and OPS films) to comparatively high surface energies (PET films), but the index of wettabilty of the preferable base material should be 40 to 60 mN/m.

Embodiment 1

(Ink Preparation)

Table 1 lists compositions of yellow, magenta, cyan, and black inks that were prepared.

The prepared inks are vacuum-degassed until the concentration of oxygen dissolved in each ink may be 0.6 ppm. The concentration of dissolved oxygen of the above embodiments were measured at 25° C. and 50% RH by the Dissolved Oxygen Tester DO-32A (by DKK-TOA Corp.).

The prepared inks were respectively supplied to each piezo type ink jet head of an ink jet printer through PFA ink tanks and pipes whose materials are low in gas transmissibility. The ink jet printer has a UV lamp on each side of the ink-jet carriage.

Then, images were printed out continuously for 2 hours or longer by the ink jet printer while the UV lamps were on. The inks were jetted out successfully even after such a long continuous recording.

Meanwhile, the prepared inks were further vacuum-degassed (at 40° C.) until the concentration of oxygen dissolved in each ink may be under 0.08 ppm. These inks were evaluated similarly to the above test procedure. After a 2-hour continuous recording, some of the ink-jet nozzles were bent and blocked. Solid or gummy inks were found on the ink jet nozzle plate. It is assumed that the inks on the ink-jet nozzle plate were quickly polymerized by slight UV lights because of insufficient dissolved oxygen.

Further, the prepared inks were evaluated similarly without being vacuum-degassed. The concentration of oxygen dissolved in each ink was 8.5 ppm. After a 2-hour continuous recording, the ink jet nozzles were and disabled to jet inks, but no solid or gummy ink was found on the nozzle plate. It is assumed that cavitations caused by the dissolved air interrupted ejection of inks. After a short break of recording, the inks can be jetted successfully again from all nozzles.

INDUSTRIAL APPLICABILITY

This invention can provide UV-setting ink-jet inks which can always be ejected normally regardless of long continuous uses and an ink jet recording method using said inks.

What is claimed is:

1. A UV-setting ink-jet ink comprising color materials, UV-polymeric compound containing a radical polymeric compound, and photo-induced polymerization initiator in a water-based medium, wherein the UV-setting ink-jet ink further comprises oxygen dissolved in the ink in an amount of 0.1 to 2 ppm at 25° C. as a polymerization inhibitor to inhibit polymerization.

TABLE 1

| Ink color | Color material | Pigment-dispersion liquid | | UV polymerization | | | | Photo-induced polymerization initiator | | Water |
|---|---|---|---|---|---|---|---|---|---|---|
| | | Concentration (% by mass) | Weight (g) | Compound 1 | | Compound 2 | | | | |
| | | | | Compound | Weight (g) | Compound | Weight (g) | Compound | Weight (g) | Weight (g) |
| Yellow | Pigment Yellow 74 | 10 | 30.0 | 1 | 4.0 | 2 | 13.0 | 3 | 0.5 | 52.5 |
| Magenta | Pigment Red 122 | 10 | 30.0 | 1 | 4.0 | 2 | 13.0 | 3 | 0.5 | 52.5 |
| Cyan | Pigment Blue 15 | 20 | 15.0 | 1 | 4.0 | 2 | 13.0 | 3 | 0.5 | 67.5 |
| Black | Pigment Black 7 | 15 | 20.0 | 1 | 4.0 | 2 | 13.0 | 3 | 0.5 | 62.5 |

The pigment-dispersion liquid of each ink contains poly-urethane resin of the number average molecular weight of 3000 as the dispersing agent.

2. An ink-jet recording method for forming images with UV-setting ink-jet ink which comprises color materials, UV-polymeric compound containing a radical polymeric compound, and photo-induced polymerization initiator in a water-based medium and further comprises dissolved oxygen of 0.1 to 2 ppm in the ink at 25° C. as a polymerization inhibitor to inhibit polymerization, the method comprising steps of:

jetting the UV-setting ink-jet ink onto a base material, and applying ultraviolet lights to the ink on the base material.

3. The UV-setting ink-jet ink of claim 1, wherein the concentration of oxygen dissolved in the ink is 0.5 to 2 ppm at 25° C.

4. The ink-jet recording method of claim 2, wherein the concentration of oxygen dissolved in the ink is 0.5 to 2 ppm at 25° C.

5. The ink-jet recording method of claim 2, further comprising a step of preserving the concentration of oxygen dissolved in the ink within 0.1 to 2 ppm at 25° C. by employing a material to shut off air for an ink supply system.

* * * * *